May 13, 1930.     C. MORTON     1,758,674
BIRD BATH
Filed July 20, 1927
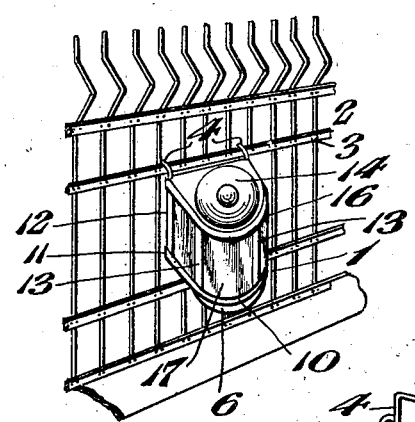
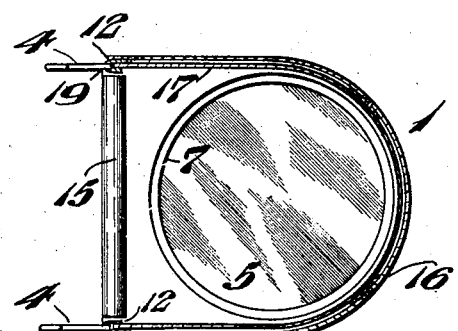
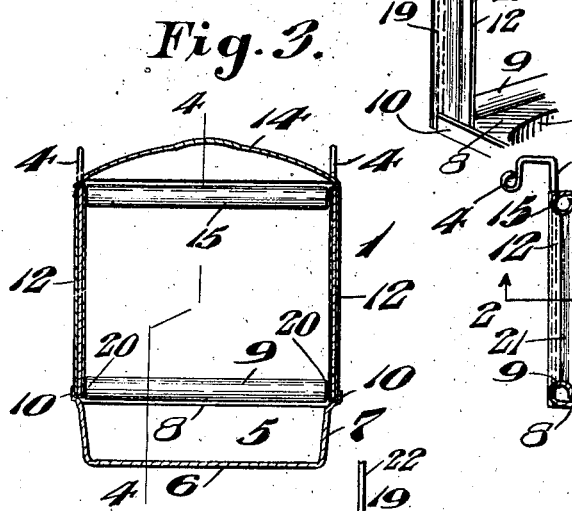
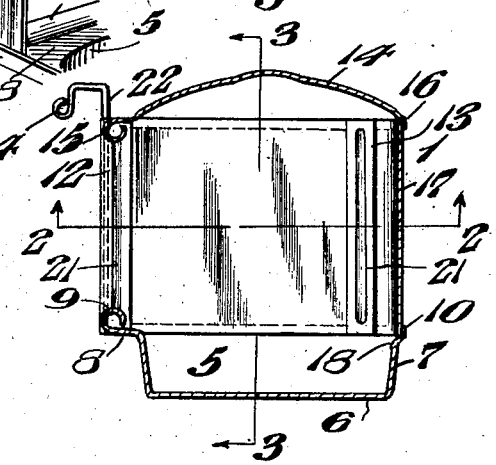
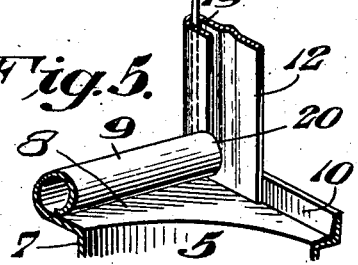
INVENTOR:
Charles Morton.
BY
ATTORNEYS.

Patented May 13, 1930

1,758,674

UNITED STATES PATENT OFFICE

CHARLES MORTON, OF PHILADELPHIA, PENNSYLVANIA

BIRD BATH

Application filed July 20, 1927. Serial No. 207,104.

My invention relates to a new and useful bird bath and more particularly to a bird bath adapted to be used in conjunction with a bird cage at intervals, whenever desired, without being permanently secured to the cage or forming an integral part thereof, so that the bath can be readily cleansed or washed out, whenever desired.

My invention further relates to a bird bath adapted to be detachably secured to a bird cage exteriorly thereof, so as not to take up any space within the cage and whereby the same may be kept clean at all times, which would not be the case if said bird bath were situated within the cage, where feed, bird seed and other deposits are likely to drop into the water.

My invention further relates to a bird bath that may be manufactured and sold in standard sizes independently of the bird cage proper, thereby rendering my novel bird bath applicable to cages of different sizes and makes.

My invention further relates to a bird bath of the character stated, wherein the well or water is entirely outside of the bird cage and thus adapted to prevent the splashing of water over the cage floor or over the floor of the room where the cage is suspended, and at the same time providing adequate bathing accommodation.

To the above ends, my invention consists of a novel bird bath, comprising a lower bowl or well member of a suitable depth and shape, a corresponding upper roof member of substantially the same size and contour, a plurality of uprights rigidly connecting said lower well member to said upper roof member, the rear pair of uprights having vertical, longitudinal grooves therein, a strip of flexible, transparent material having its upper and lower edges engaged by the upper roof and lower well members respectively and its free ends engaging said grooves in said uprights, completely to inclose the space between said roof and well members, and hooks on the rear of said bird bath whereby the same may be detachably secured to a bird cage in registering alignment with the door or other opening in said cage.

For the purpose of illustrating my invention, I have shown in the accompanying drawings, a form thereof which is at present preferred by me since it will give in practice satisfactory and reliable results, although it is to be understood that the various instrumentalities of which my invention consists, can be variously arranged and organized and that my invention is not limited to the precise arrangement and organization of these instrumentalities as herein shown and described.

In the accompanying drawings,

Figure 1 represents a perspective view of a bird bath embodying my invention, showing also a portion of a bird cage to which my invention is applied.

Figure 2 represents a horizontal section on line 2—2 of Figure 4.

Figure 3 represents a vertical section on line 3—3 of Figure 4.

Figure 4 represents a vertical section on line 4—4 of Fig. 3.

Figure 5 represents in detail a perspective view showing the novel construction of my bird bath.

Figure 6 represents a perspective view of one of the rear uprights showing the hook member therein.

Referring to the drawings, in which like reference characters indicate like parts, 1 designates my novel construction of bird bath and 2 designates a portion of a bird cage to which the same is applicable, said cage being provided with horizontal bars or rails, as indicated at 3, upon one of which the bird bath is supported or secured by means of the hooks 4. My novel bird bath comprises a bottom well or bath chamber 5 which is contained within the bottom wall 6 and upwardly extending annular wall 7, which is provided at its rear with the lateral extension 8 terminating in the rear horizontal bead 9 formed by rolling or deflecting inwardly the end portion of the extension 8, as will be understood from Fig. 5. The wall 8 is provided with the upwardly deflected annular flange 10 whose terminal is indicated at 11 and in the U shaped seat between said terminal 11 and the end of the lower bead 9, I secure the lower portion of the rear upright 12 there being two of these uprights, only one of which is shown in Fig. 1. Within the flange 10 I secure the lower ends of the front uprights 13. The top or roof 14 of the bird bath is provided with the rear bead 15, which is formed integral with the top 14 by deflecting the rear portion thereof downwardly and thence upwardly as seen in Fig. 4. 16 designates a pendant flange integral with the top 14, and extending around said top as will be understood from Figs. 1 and 4. The upper ends of the uprights 12 and 13 are soldered, brazed or otherwise secured within the pendant flange 16 as will be understood from Fig. 4, so that the resultant construction comprising the well or bath chamber 5, the uprights 12 and 13 and the roof or top 14 is very rigid and durable and is further reinforced and stiffened by the upper and lower beads 15 and 9. The space between the top and well portion of the bath is inclosed by means of a strip of celluloid or the like 17, whose upper edge is confined in the upper pendant flange 16 and whose lower edge is confined within the flange 10 and rests upon the annular seat 18. The rear ends of the strip 17 are confined within the upright grooves 19 of the rear uprights 12 and between the ends of the bead 8, which terminates short of the uprights 12, as will be understood from Fig. 5, the ends of the upper bead 15 also terminating a slight distance from the upper ends of the rear uprights 12. The uprights 12 and 13 are provided with the stiffening grooves or ribs 21, which serve to reinforce and stiffen the entire structure.

Thus whenever it is desired to employ the bird bath of my novel construction, it is merely necessary to hook the same onto a cross bar of the wall of the cage, in registering alignment with the door or other opening as will be understood from Fig. 1. The strip 17 of any transparent material, preferably celluloid, serves not only to inclose the bird bath to prevent the escape of the bird, but also to prevent the splashing of water all over the floor of the cage and the floor of the room where such cage is suspended. After the bird has bathed or during cold weather when there is not need for the bird bath, the same can be removed, leaving the cage unencumbered. It is also evident that by this novel construction in a bird bath, the water is kept clean since it is in an out-of-the-way position where feed and other foreign matter can not fall thereinto. Another advantage of my novel construction is that the bird bath occupies no space at all within the cage, thereby affording the bird the maximum possible space for movement.

It will further be apparent that I have constructed a novel bird bath which may be secured in position on, or detached from the cage with a minimum of time and effort and without the necessity of introducing the hand into the cage which often results in the accidental escape of the bird or in frightening and annoying the same. It will also be seen that I have devised a novel and useful bird bath which in addition to possessing universal applicability is also inexpensive to produce.

It will be apparent that since the well portion 5, composed of the bottom and side walls 6 and 7 is a unitary or integral construction made of thin sheet metal, as are also the other elements of my novel device, a very light, durable and rigid structure is obtained, which is so light that when it is assembled with respect to the cage, even when the well is filled with water, the bath will not tend to be tipped or inclined.

It will further be apparent that the elongated member or portion 22 of each hook 4 is extended throughout the entire length of the groove 19 in each of the rear uprights 12, so that the latter are greatly stiffened and reinforced by this construction, and as the limb 22 of the hook is clamped and secured between the walls of the grooves 19 for its entire length, there is no danger of the bath being disconnected in use from said hooks.

It will now be apparent that I have devised a novel and useful bird bath which embodies the features or advantages stated as desirable in the statement of the invention and the above description, and while I have, in the present instance, shown and described an embodiment thereof which is at present preferred by me since it will give in practice, satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent is:

In a bird bath of the character stated, a one piece bottom member having a depressed, seamless well formed therein, a horizontal platform at the rear portion of said well and terminating in a rear reinforcing bead forming a perch above said platform, a vertical annular flange integral with and surrounding said well and platform and having its rear ends contiguous with the ends of said bead, a one piece roof comprising a dome, a horizontal wall surrounding the rear portion of said dome and terminating in a pendant rear, reinforcing bead, and a pendant annular flange surrounding said dome and horizontal wall and having its rear edges contiguous with the ends of said rear bead, front uprights rigidly connecting said roof to said bottom member rear uprights rigidly connecting the corresponding vertically aligned ends of the beads on said roof and bottom members, said rear uprights having vertical grooves therein, a transparent flexible strip enclosing the sides and front of said bird bath, and having its upper and lower horizontal edges confined within the upper and lower flanges of said roof and bottom members and within said front uprights, said strip having its rear vertical edges engaging the vertical grooves in said rear uprights, and rods carried by said rear uprights and having upper hooks for detachably securing said bird bath to a bird cage with the rear unenclosed portion of said bird bath in alignment with an opening in said bird cage.

CHARLES MORTON.